US012670489B2

(12) United States Patent
Savanah et al.

(10) Patent No.: US 12,670,489 B2
(45) Date of Patent: Jun. 30, 2026

(54) BLOCKCHAIN IMPLEMENTED METHOD AND SYSTEM

(71) Applicant: nChain Holdings Limited, St. John's (AG)

(72) Inventors: Stephane Savanah, London (GB); Craig Steven Wright, London (GB); Ying Chan, London (GB)

(73) Assignee: NCHAIN LICENSING AG, Zug (CH)

( * ) Notice: Subject to any disclaimer, the term of this patent is extended or adjusted under 35 U.S.C. 154(b) by 1027 days.

(21) Appl. No.: 16/320,995

(22) PCT Filed: Jul. 24, 2017

(86) PCT No.: PCT/IB2017/054462
§ 371 (c)(1),
(2) Date: Jan. 25, 2019

(87) PCT Pub. No.: WO2018/020389
PCT Pub. Date: Feb. 1, 2018

(65) Prior Publication Data
US 2022/0058614 A1 Feb. 24, 2022

(30) Foreign Application Priority Data

Jul. 29, 2016 (GB) ..................................... 1613109

(51) Int. Cl.
*G06Q 20/22* (2012.01)
*G06Q 20/38* (2012.01)

(52) U.S. Cl.
CPC ........... *G06Q 20/29* (2013.01); *G06Q 20/223* (2013.01); *G06Q 20/3827* (2013.01); *G06Q 20/389* (2013.01); *G06Q 2220/00* (2013.01)

(58) Field of Classification Search
CPC .. G06Q 20/29; G06Q 20/223; G06Q 20/3827; G06Q 20/389; G06Q 2220/00
See application file for complete search history.

(56) References Cited

U.S. PATENT DOCUMENTS

2015/0278820 A1 10/2015 Meadows
2015/0379510 A1 12/2015 Smith
(Continued)

FOREIGN PATENT DOCUMENTS

WO 2015171580 A1 11/2015

OTHER PUBLICATIONS

Curran, Tom, and Dana Geist. "Using the bitcoin blockchain as a botnet resilience mechanism." (2016): 2016-2017. (Year: 2016).*
(Continued)

*Primary Examiner* — Calvin L Hewitt, II
*Assistant Examiner* — Brock E Turk
(74) *Attorney, Agent, or Firm* — Tarolli, Sundheim, Covell & Tummino LLP

(57) ABSTRACT
The invention provides a computer-implemented method for performing an exchange via a blockchain, comprising the step of submitting a funding transaction to the blockchain network, wherein the funding transaction i) comprises a tokenised contract relating to an asset to be transferred from a second user to a first user; and ii) is signed by the first user. It also comprises the step of sending, from the first user to the second user, one or more subsequent transactions wherein each said subsequent transaction spends an output of the funding transaction and is signed by the first user. It includes the step of submitting one of the subsequent transactions to the blockchain network, the submitted transaction having been signed by the second user.

10 Claims, 16 Drawing Sheets

(56)            References Cited

U.S. PATENT DOCUMENTS

| | | | |
|---|---|---|---|
| 2016/0086175 A1 | 3/2016 | Finlow-Bates et al. | |
| 2016/0164884 A1 | 6/2016 | Sriram et al. | |
| 2016/0330034 A1* | 11/2016 | Back | G06Q 20/065 |
| 2017/0178127 A1* | 6/2017 | Kravitz | G06Q 20/38215 |
| 2017/0180134 A1* | 6/2017 | King | H04L 63/0853 |
| 2017/0187535 A1* | 6/2017 | Middleton | H04L 9/3247 |

OTHER PUBLICATIONS

Decker, Christian, and Roger Wattenhofer. "A fast and scalable payment network with bitcoin duplex micropayment channels." Symposium on Self-Stabilizing Systems. Springer, Cham, 2015. (Year: 2015).*
Buterin, Vitalik. "A next-generation smart contract and decentralized application platform." white paper 3.37 (2014): 2-1. (Year: 2014).*
"Payment channels, Lightning FAQ," Counterparty, https://counterparty.io/docs/paymentchannels-lightning-faq/, copyright 2014 [retrieved Mar. 7, 2019], 4 pages.
Bitfury Group, "Digital Assets on Public Blockchains," retrieved from http://bitfury.com/content/5-white-papers-research/bitfury-digital_assets_on_public_blockchains-1.pdf, Mar. 15, 2016, 37 pages.
Buntinx, "Bankymoon to Launch Bitcoin-funded Smart Energy Meter," Bitcoin.com News, https://news.bitcoin.com/bankymoon-bitcoin-smart-meter/, Mar. 10, 2016 [retrieved Mar. 7, 2019], 10 pages.
Campbell, "Bitcoin Blockchain Proof-of-Concept: Storj and Counterparty Partner to Add Support for Payment Channels," retrieved from https://cointelegraph.com/news/bitcoin-blockchain-proof-of-concept-storj-and-counterpartypartner-to-add-support-for-payment-channels, Jul. 2016, 4 pages.
Christidis et al., "Blockchains and Smart Contracts for the Internet of Things," IEEE Access 4(1):2292-2303, May 10, 2016.
Curran et al., "Using the Bitcoin Blockchain as a Botnet Resilience Mechanism," University of Amsterdam Master of Sciences: System and Network Engineering: Offensive Technologies, May 27, 2016, 29 pages.
Decker et al., "A Fast and Scalable Payment Network with Bitcoin Duplex Micropayment Channels," Symposium on Self-Stabilizing Systems, Aug. 18, 2015, 16 pages.
GitHub, "Slock.it," retrieved from https://github.com/slockit, Nov. 29, 2016, 3 pages.

Heilman et al., "Blindly Signed Contracts: Anonymous On-Blockchain and Off-Blockchain Bitcoin Transactions," International Conference on Financial Cryptography and Data Security, Feb. 22, 2016, 15 pages.
Higgins, "How Bitcoin Brought Electricity to a South African School," CoinDesk, https://www.coindesk.com/south-african-primary-school-blockchain, Mar. 9, 2016 [retrieved Mar. 7, 2019], 11 pages.
International Search Report and Written Opinion mailed Jan. 16, 2018, Patent Application No. PCT/IB2017/054462, 18 pages.
Prisco, "Slock.It to Introduce Smart Locks Linked to Smart Ethereum Contracts, Decentralize the Sharing Economy," Bitcoin Magazine, Nov. 5, 2015, https://bitcoinmagazine.com/articles/slock-it-to-introduce-smart-locks-linked-to-smart-ethereum-contracts-decentralize-the-sharing-economy-1446746719, pages.
Redman, "IoT Startup: The Ethereum Computer is Going to Change Everything," Bitcoin.com News, https://news.bitcoin.com/iot-startup-ethereum-computer-going-change-everything/, Dec. 11, 2015 [retrieved Mar. 7, 2019], 10 pages.
Slockit, "Blockchain + IoT," retrieved from https://slock.it/index.html, 2016, 8 pages.
UK Commercial Search Report mailed Feb. 2, 2017, Patent Application No. GB1613109.6, 7 pages.
UK IPO Search Report mailed Sep. 30, 2016, Patent Application No. GB1613109.6, 8 pages.
Whiteboyfntastic1 et al., "Serious question: why do we need lightning network if we already have coinbase?," Reddit r/bitcoin, https://www.reddit.com/r/Bitcoin/comments/4bmhvs/serious_question_why_do_we_need_lightning_network/, Mar. 23, 2016 [retrieved Mar. 7, 2019], 7 pages.
Wilkinson, "Storj a Peer-to-Peer Cloud Storage Network," retrieved from https://storj.io/storj.pdf, Dec. 15, 2014, 18 pages.
Xing et al., "Survey on Botnet Detection Techniques: Classification, Methods, and Evaluation," Mathematical Problems in Engineering, Nov. 17, 2020, 24 pages.
Antonopoulos, "Mastering Bitcoin—Unlocking Digital Cryptocurrencies," O'Reilly Media, Inc., Dec. 20, 2014, 282 pages.
Nakamoto, "Bitcoin: A Peer-to-Peer Electronic Cash System," Bitcoin, Oct. 31, 2008, https://bitcoin.org/bitcoin.pdf, 9 pages.
Satoshi et al., "Connection Limits," Bitcoin Forum, Aug. 9, 2010, https://bitcointalk.org/index.php?topic=741.0; prev_next=prev, 2 pages.
Franco, "Understanding Bitcoin: Cryptography, Engineering and Economics," O'Reilly, Chapter 6 Transactions, 2014, 16 pages.
Christidis, K. et al., "Blockchains and Smart Contracts for the Internet of Things", IEEE Access, vol. 4. 2016 pp. 2292-2303.

* cited by examiner

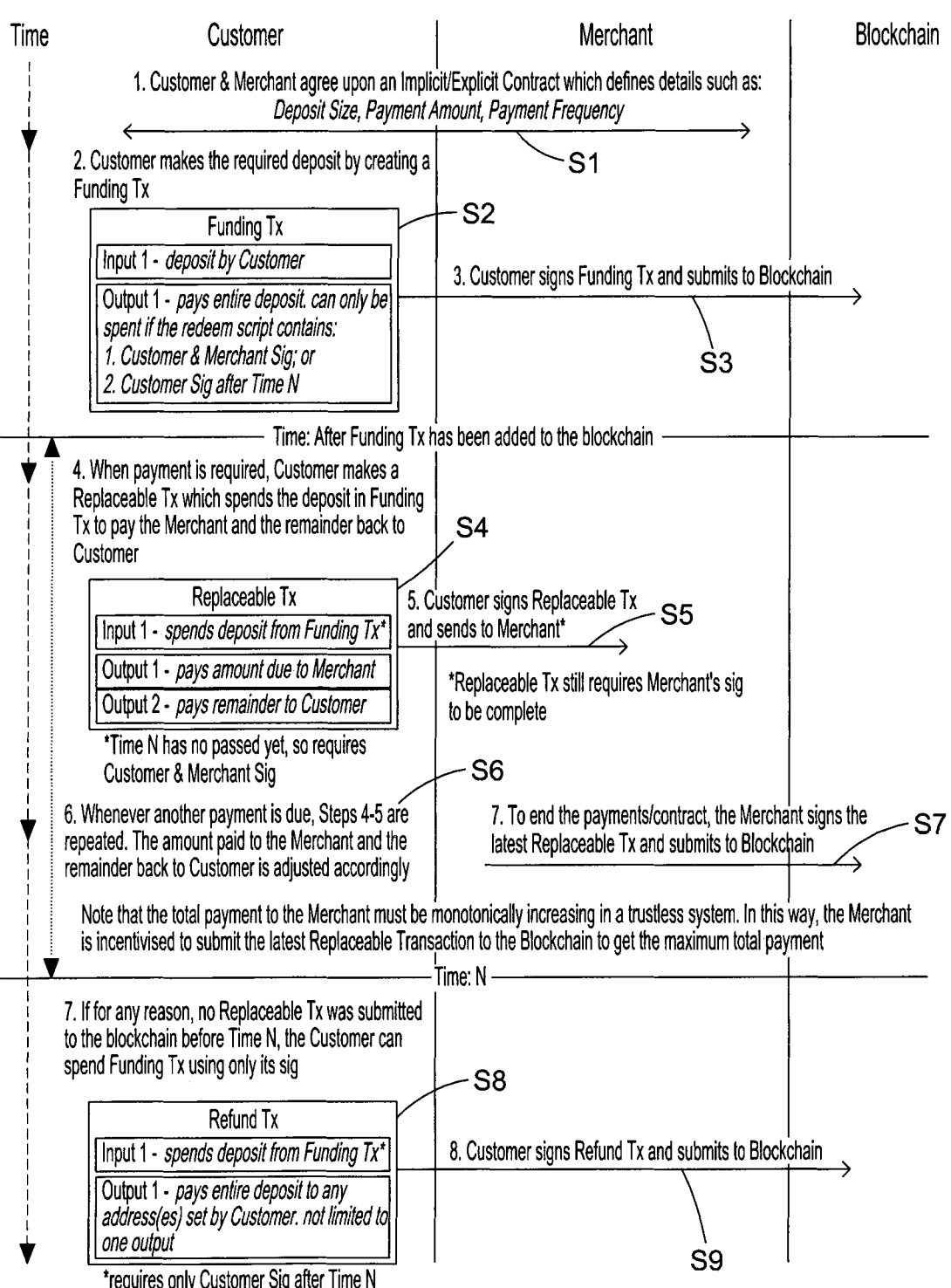

Time

Customer

Merchant

Blockchain

1. Customer & Merchant agree upon an Implicit/Explicit Contract which defines details such as: *Deposit Size, Payment Amount, Payment Frequency*

S1

2. Customer makes the required deposit by creating a Funding Tx

S2

Funding Tx

| Input 1 - *deposit by Customer* |
| --- |
| Output 1 - *pays entire deposit. can only be spent if the redeem script contains:* <br> *1. Customer & Merchant Sig; or* <br> *2. Customer Sig after Time N* |

3. Customer signs Funding Tx and submits to Blockchain

S3

— Time: After Funding Tx has been added to the blockchain —

4. When payment is required, Customer makes a Replaceable Tx which spends the deposit in Funding Tx to pay the Merchant and the remainder back to Customer

S4

Replaceable Tx

| Input 1 - *spends deposit from Funding Tx** |
| --- |
| Output 1 - *pays amount due to Merchant* |
| Output 2 - *pays remainder to Customer* |

*Time N has no passed yet, so requires Customer & Merchant Sig

5. Customer signs Replaceable Tx and sends to Merchant*

S5

*Replaceable Tx still requires Merchant's sig to be complete

S6

6. Whenever another payment is due, Steps 4-5 are repeated. The amount paid to the Merchant and the remainder back to Customer is adjusted accordingly 7. To end the payments/contract, the Merchant signs the latest Replaceable Tx and submits to Blockchain

S7

Note that the total payment to the Merchant must be monotonically increasing in a trustless system. In this way, the Merchant is incentivised to submit the latest Replaceable Transaction to the Blockchain to get the maximum total payment — Time: N —

7. If for any reason, no Replaceable Tx was submitted to the blockchain before Time N, the Customer can spend Funding Tx using only its sig

S8

Refund Tx

| Input 1 - *spends deposit from Funding Tx** |
| --- |
| Output 1 - *pays entire deposit to any address(es) set by Customer. not limited to one output* |

*requires only Customer Sig after Time N

8. Customer signs Refund Tx and submits to Blockchain

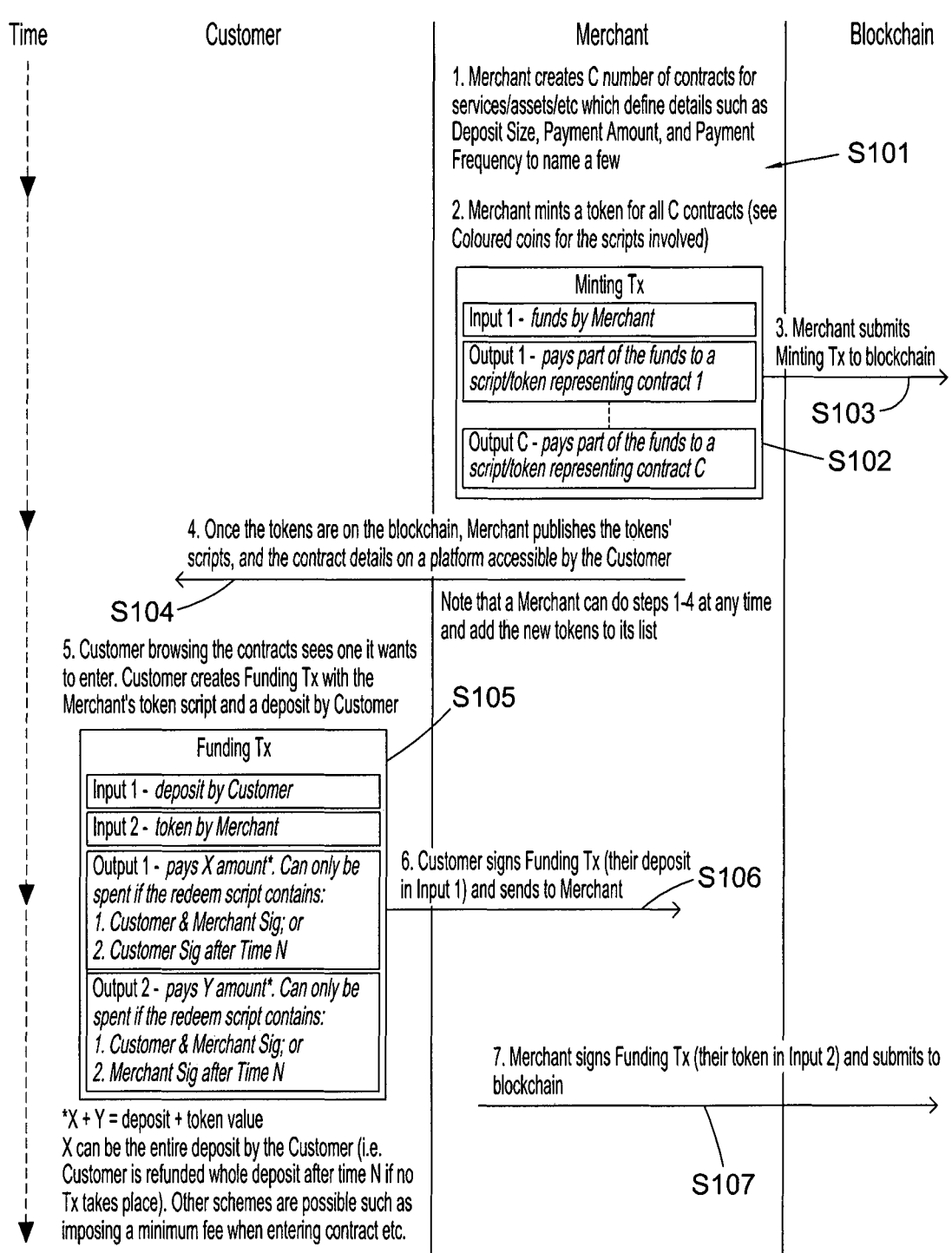

Time          Customer                    Merchant                    Blockchain 1. Merchant creates C number of contracts for
services/assets/etc which define details such as
Deposit Size, Payment Amount, and Payment
Frequency to name a few                                    S101

2. Merchant mints a token for all C contracts (see
Coloured coins for the scripts involved)

Minting Tx

Input 1 - *funds by Merchant*

Output 1 - *pays part of the funds to a
script/token representing contract 1*

Output C - *pays part of the funds to a
script/token representing contract C*

3. Merchant submits
Minting Tx to blockchain

S103

S102

4. Once the tokens are on the blockchain, Merchant publishes the tokens'
scripts, and the contract details on a platform accessible by the Customer

S104

Note that a Merchant can do steps 1-4 at any time
and add the new tokens to its list 5. Customer browsing the contracts sees one it wants
to enter. Customer creates Funding Tx with the
Merchant's token script and a deposit by Customer          S105

Funding Tx

Input 1 - *deposit by Customer*

Input 2 - *token by Merchant*

Output 1 - *pays X amount\*. Can only be
spent if the redeem script contains:
1. Customer & Merchant Sig; or
2. Customer Sig after Time N*

Output 2 - *pays Y amount\*. Can only be
spent if the redeem script contains:
1. Customer & Merchant Sig; or
2. Merchant Sig after Time N*

6. Customer signs Funding Tx (their deposit
in Input 1) and sends to Merchant          S106

7. Merchant signs Funding Tx (their token in Input 2) and submits to
blockchain

S107

\*X + Y = deposit + token value
X can be the entire deposit by the Customer (i.e.
Customer is refunded whole deposit after time N if no
Tx takes place). Other schemes are possible such as
imposing a minimum fee when entering contract etc.

Fig. 2

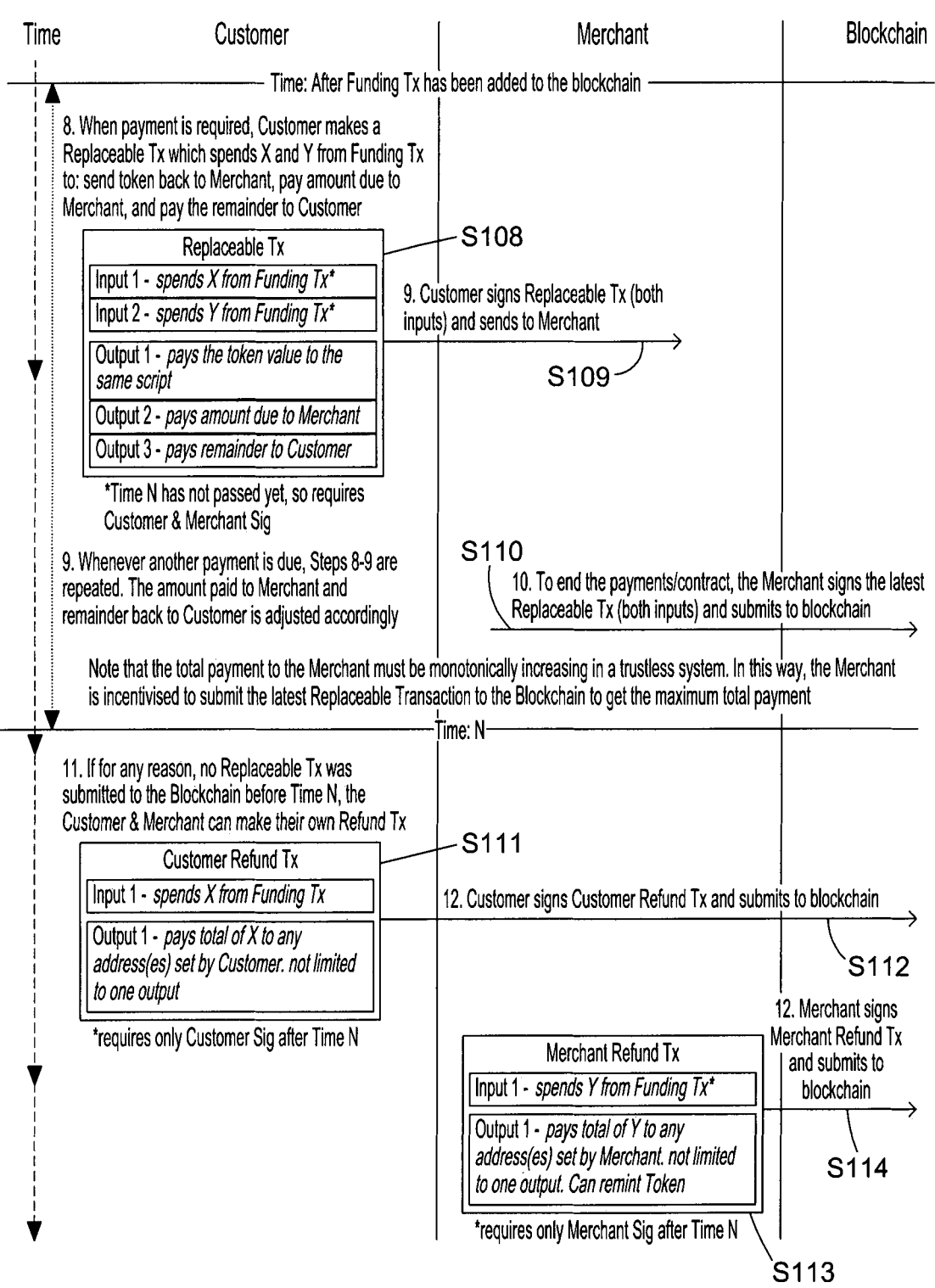
Fig. 2 - continued

S201

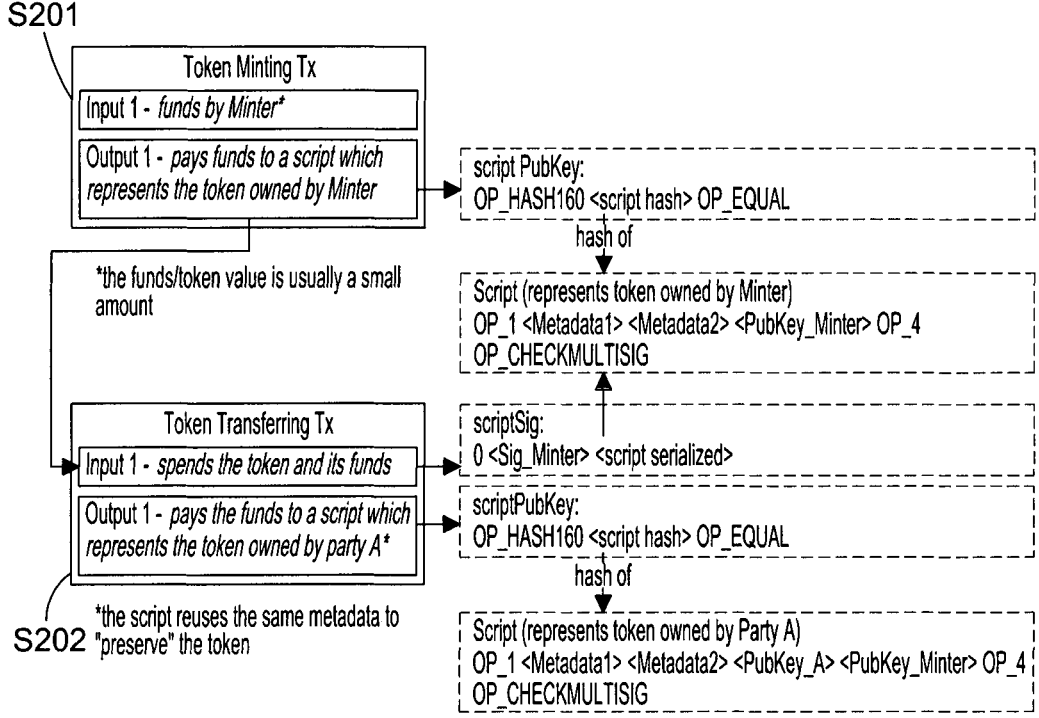

| Token Minting Tx |
| --- |
| Input 1 - *funds by Minter\** |
| Output 1 - *pays funds to a script which represents the token owned by Minter* |

*the funds/token value is usually a small amount script PubKey:
OP_HASH160 <script hash> OP_EQUAL hash of Script (represents token owned by Minter)
OP_1 <Metadata1> <Metadata2> <PubKey_Minter> OP_4
OP_CHECKMULTISIG

| Token Transferring Tx |
| --- |
| Input 1 - *spends the token and its funds* |
| Output 1 - *pays the funds to a script which represents the token owned by party A\** |

S202 *the script reuses the same metadata to "preserve" the token scriptSig:
0 <Sig_Minter> <script serialized> scriptPubKey:
OP_HASH160 <script hash> OP_EQUAL hash of

Script (represents token owned by Party A)
OP_1 <Metadata1> <Metadata2> <PubKey_A> <PubKey_Minter> OP_4
OP_CHECKMULTISIG

*Minter's PubKey is not necessary, but allows the Minter to control how Party A uses the token. (e.g. prevents Party A from melting the token)

Fig. 3

Minting Transaction Details

| Minting Transaction | |
| --- | --- |
| MINTING_TX | |
| | |
| 1 | |
| <Tx containing Funds by Merchant, assume 1,000 Satoshis> | |
| <Tx Index of Funds> | |
| | |
| <Script required to unlock Funds> | |
| <ScriptSignatureFlags> | |
| 0xFFFFFFFF | |
| 1 | |
| 1,000 | |
| | |
| OP_HASH160 <script_hash_token> OP_EQUAL | |
| 0 | |

Fig. 4A

- Input 1 - funds by Merchant to mint the token
    - Funds amount and unlocking script is arbitrary

- Output 1 - pays funds to <script_hash_token> which is Hash160 of the script:

| Script | OP_1 <Metadata1> <Metadata2> <PubKey_Merchant> OP_3 OP_CHECKMULTISIG where metadata1 & metadata2 are pretend compressed public keys containing information about the contract |
| --- | --- |

Fig. 4B

Funding Transaction Details

| Funding Transaction | |
|---|---|
| FUNDING_TX | |
| | |
| 2 | |
| <Tx containing Deposit by Customer, assume 500,000 Satoshis> | |
| <Tx Index of Deposit> | |
| | |
| <Script required to unlock Deposit> | |
| <ScriptSignatureFlags> | |
| 0xFFFFFFFF | |
| MINTING_TX | |
| IDX_001 | |
| | |
| | |
| <Sig Merchant> <script_serialized_token> | |
| <ScriptSignatureFlags> | |
| 0xFFFFFFFF | |
| 2 | |
| 450,000 | |
| | |
| OP_HASH160 <script_hash_customer> OP_EQUAL | |
| 51,000 | |
| | |
| OP_HASH160 <script_hash_merchant> OP_EQUAL | |
| 0 | |

Fig. 5A

- Input 1 - deposit by the Customer as required by contract
  - The deposit amount and unlocking method is arbitrary

- Input 2 - token by Merchant, Customer copies this from a platform where the Merchant publishes the contract and token script. <script_serialized_token> is serialized token script:

| Script | OP_1 <Metadata1> <Metadata2> <PubKey_Merchant> OP_3 OP_CHECKMULTISIG where metadata1 & metadata2 contain information about the contract |
|---|---|

- Output 1 - pays X amount to <script_hash_customer> which is a Hash160 of:

| Script | OP_IF <now + time N> OP_CHECKLOCKTIMEVERIFY OP_DROP <PubKey_Customer> OP_CHECKSIGVERIFY OP_ELSE <PubKey_Customer> <PubKey_Merchant> OP_2 OP_CHECKMULTISIGVERIFY OP_ENDIF |
|---|---|

- <script_hash_customer> can be unlocked by:
    - OP_1 <Sig_Customer> <serialized script customer>    with Locktime N; or
    - OP_0 <Sig_Customer> <Sig Merchant> <serialized script customer>
  - X amount paid (450,000 here) is adjustable depending on contract terms. i.e. how much is refunded to Customer if no Replaceable Transaction is submitted to the blockchain before time N

- Output 2 - pays Y amount to <script_hash_merchant> which is a Hash160 of:

| Script | OP_IF <now + time N> OP_CHECKLOCKTIMEVERIFY OP_DROP <PubKey_Merchant> OP_CHECKSIGVERIFY OP_ELSE <PubKey_Customer> <PubKey_Merchant> OP_2 OP_CHECKMULTISIGVERIFY OP_ENDIF |
|---|---|

- <script_hash_merchant> can be unlocked by:
    - OP_1 <Sig_Merchant> <serialized script merchant>    with Locktime N; or
    - OP_0 <Sig_Customer> <Sig Merchant> <serialized script merchant>
  - Y amount paid (50,000 here) is adjustable depending on contract terms. i.e. how much is paid to Merchant if no Replaceable Transaction is submitted to the blockchain before time N

Fig. 5B

Replaceable Transaction Details

| Replaceable Transaction | |
|---|---|
| REPLACEABLE_TX | |
| | |
| 2 | |
| FUNDING_TX | |
| IDX_001 | |
| | |
| OP_0 <Sig_Customer> <Sig Merchant> <serialized script customer> | |
| <ScriptSignatureFlags> | |
| 0xFFFFFFFF | |
| FUNDING_TX | |
| IDX_002 | |
| | |
| OP_0 <Sig_Customer> <Sig Merchant> <serialized script merchant> | |
| <ScriptSignatureFlags> | |
| 0xFFFFFFFF | |
| 3 | |
| 1,000 | |
| | |
| OP_HASH160 <Script_hash_token> OP_EQUAL | |
| 10,000 | |
| | |
| OP_DUP OP_HASH160 <Address Merchant> OP_EQUALVERIFY OP_CHECKSIG | |
| 490,000 | |
| | |
| OP_DUP OP_HASH160 <Address Customer> OP_EQUALVERIFY OP_CHECKSIG | |
| 0 | |

Fig. 6A

- Input 1 - spends Output 1 of Funding Tx using Customer & Merchant sig to unlock <serialized script customer>:

| Script | OP_IF <now + time N> OP_CHECKLOCKTIMEVERIFY OP_DROP <PubKey_Customer> OP_CHECKSIGVERIFY OP_ELSE <PubKey_Customer> <PubKey_Merchant> OP_2 OP_CHECKMULTISIGVERIFY OP_ENDIF |
|---|---|

- Input 2 - spends Output 2 of Funding Tx using Customer & Merchant sig to unlock <serialized script merchant>:

| Script | OP_IF <now + time N> OP_CHECKLOCKTIMEVERIFY OP_DROP <PubKey_Merchant> OP_CHECKSIGVERIFY OP_ELSE <PubKey_Customer> <PubKey_Merchant> OP_2 OP_CHECKMULTISIGVERIFY OP_ENDIF |
|---|---|

- Output 1 - pays funds to <script_hash_token> which is Hash160 of the script:

| Script | OP_1 <Metadata1> <Metadata2> <PubKey_Merchant> OP_3 OP_CHECKMULTISIG where metadata1 & metadata2 are pretend compressed public keys contain information about the contract |
|---|---|

- o This sends the token back to the Merchant

- Output 2 - pays amount owed to Merchant
  This amount should be monotonically increasing with each new Replaceable Tx

- Output 3 - pays remainder of deposit to Customer

Fig. 6B

Customer Refund Transaction Details

| Customer Refund Transaction | |
|---|---|
| CUSTOMER_REFUND_TX | |
| | |
| 1 | |
| FUNDING_TX | |
| IDX_001 | |
| | |
| OP_1 <Sig_Customer> <serialized script customer> | |
| <ScriptSignatureFlags> | |
| 0x00000001 | |
| 1 | |
| 450,000 | |
| | |
| OP_DUP OP_HASH160 <Address Customer> OP_EQUALVERIFY OP_CHECKSIG | |
| N | |

Fig. 7A

- Input 1 - spends Output 1 of Funding Tx using Customer sig to unlock <serialized script customer>:

| Script | OP_IF <now + time N> OP_CHECKLOCKTIMEVERIFY OP_DROP <PubKey_Customer> OP_CHECKSIGVERIFY OP_ELSE <PubKey_Customer> <PubKey_Merchant> OP_2 OP_CHECKMULTISIGVERIFY OP_ENDIF |
|---|---|

- Note that the Sequence Number is not 0xFFFFFFFF which signals for Locktime N to be checked

- Output 1 - pays the amount in Funding Tx Output 1 to whatever addresses Customer chooses to nominate

Fig. 7B

Merchant Refund Transaction Details

| Merchant Refund Transaction | |
| --- | --- |
| MERCHANT_REFUND_TX | |
| | |
| 1 | |
| FUNDING_TX | |
| IDX_002 | |
| | |
| OP_1 <Sig_Merchant> <serialized script merchant> | |
| <ScriptSignatureFlags> | |
| 0x00000001 | |
| 1 | |
| 50,000 | |
| | |
| OP_DUP OP_HASH160 <Address Customer> OP_EQUALVERIFY OP_CHECKSIG | |
| N | |

Fig. 8A

- Input 1 - spends Output 1 of Funding Tx using Merchant sig to unlock <serialized script merchant>:

| Script | OP_IF <now + time N> OP_CHECKLOCKTIMEVERIFY OP_DROP <PubKey_Merchant> OP_CHECKSIGVERIFY OP_ELSE <PubKey_Customer> <PubKey_Merchant> OP_2 OP_CHECKMULTISIGVERIFY OP_ENDIF |
| --- | --- |

- Note that the Sequence Number is not 0xFFFFFFFF which signals for Locktime N to be checked

- Output 1 - pays the amount in Funding Tx Output 2 to whatever addresses Merchant chooses to nominate
   - Merchant can choose to use one of the outputs to remint the token

Fig. 8B

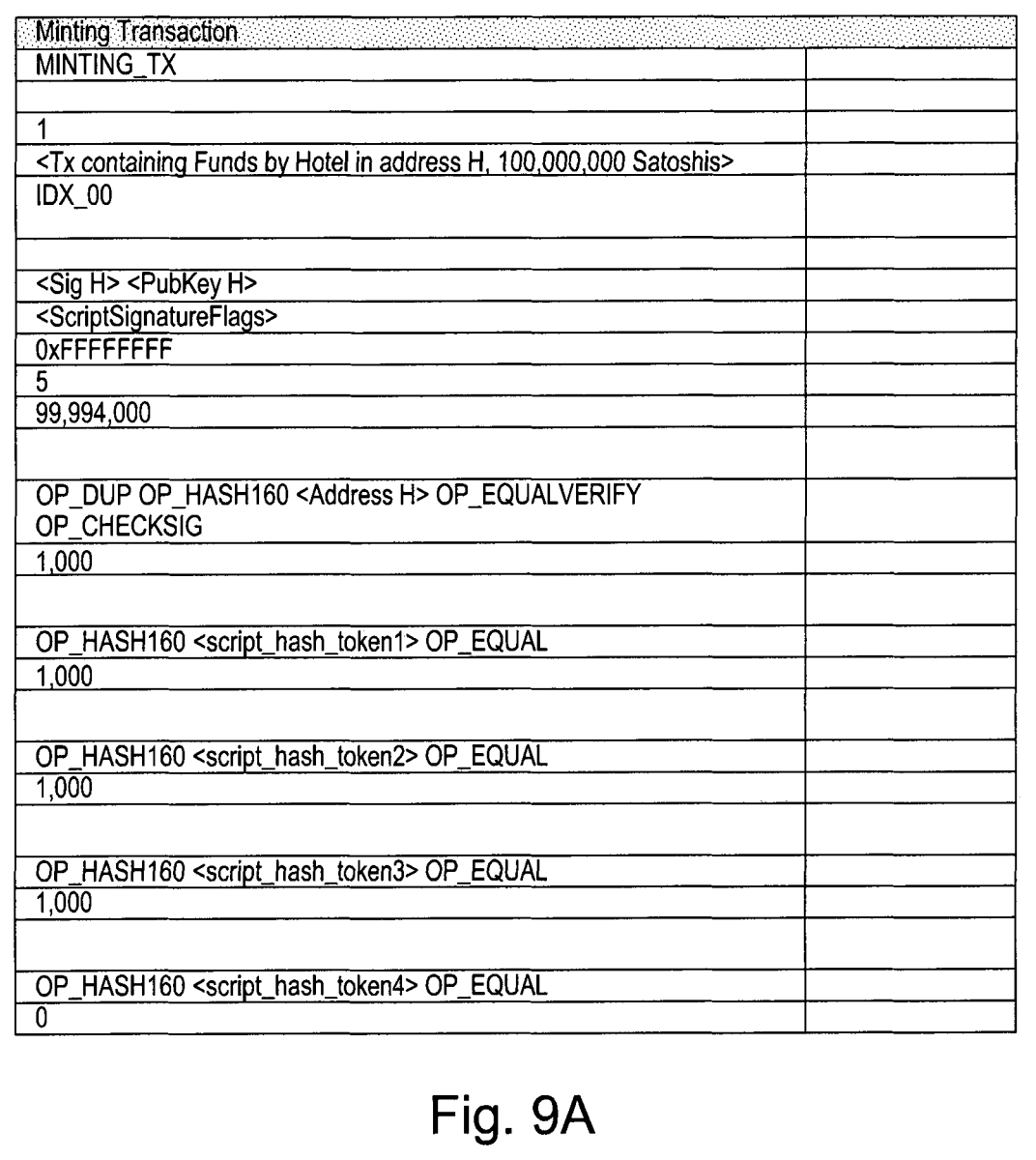

| Minting Transaction | |
|---|---|
| MINTING_TX | |
| | |
| 1 | |
| <Tx containing Funds by Hotel in address H, 100,000,000 Satoshis> | |
| IDX_00 | |
| | |
| <Sig H> <PubKey H> | |
| <ScriptSignatureFlags> | |
| 0xFFFFFFFF | |
| 5 | |
| 99,994,000 | |
| | |
| OP_DUP OP_HASH160 <Address H> OP_EQUALVERIFY OP_CHECKSIG | |
| 1,000 | |
| | |
| OP_HASH160 <script_hash_token1> OP_EQUAL | |
| 1,000 | |
| | |
| OP_HASH160 <script_hash_token2> OP_EQUAL | |
| 1,000 | |
| | |
| OP_HASH160 <script_hash_token3> OP_EQUAL | |
| 1,000 | |
| | |
| OP_HASH160 <script_hash_token4> OP_EQUAL | |
| 0 | |

Fig. 9A

Output 1 - P2PKH. Pays the remaining funds back to Hotel's address H

Output 2 - P2SH (Token 1). Pays 1,000 Satoshi to the hash of the script <script_hash_token3>:

| Script | OP_1 <Metadata1> <Metadata2> <PubKey H> OP_3 OP_CHECKMULTISIG where metadata1 & metadata2 are pretend compressed public keys contain information about contract 1 |
|---|---|

Fig. 9B

| Funding Transaction |
|---|
| FUNDING_TX |
|  |
| 2 |
| <Tx containing Funds by Guest in address G, 6,000,000 Satoshis> |
| IDX_00 |
|  |
| <Sig G> <PubKey G> |
| <ScriptSignatureFlags> |
| 0xFFFFFFFF |
| MINTING_TX |
| IDX_004 |
|  |
| <Placeholder for Sig H> <script_serialized_token3> |
| <ScriptSignatureFlags> |
| 0xFFFFFFFF |
| 2 |
| 3,000,000 |
|  |
| OP_HASH160 <script_hash_guest> OP_EQUAL |
| 3,000,000 |
|  |
| OP_HASH160 <script_hash_hotel> OP_EQUAL |
| 0 |

Fig. 10A

Input 2 - Copy of the token details on Hotel's intranet site.
Requires the Hotel's signature to be complete Output 1 - P2SH. Pays 3,000,000 to the hash of the script
<script_hash_guest>:

| Script | OP_IF <now + 48hrs> OP_CHECKLOCKTIMEVERIFY OP_DROP |
| | <PubKey G> OP_CHECKSIGVERIFY OP_ELSE <PubKey G> |
| | <PubKey H> OP_2 OP_CHECKMULTISIGVERIFY OP_ENDIF |

The locked funds can be claimed by the Guest in 48 hours time
if not spent.

Output 2 - P2SH. Pays 3,001,000 to the hash of the script
<script_hash_hotel>:

| Script | OP_IF <now + 48hrs> OP_CHECKLOCKTIMEVERIFY OP_DROP |
| | <PubKey H> OP_CHECKSIGVERIFY OP_ELSE <PubKey G> |
| | <PubKey H> OP_2 OP_CHECKMULTISIGVERIFY OP_ENDIF |

The locked funds can be claimed by the Hotel in 48 hours time.
This is the minimum payment due as per Contract 3 and the
value of the token itself.

Fig. 10B

| Replaceable Transaction | |
|---|---|
| REPLACEABLE_TX | |
| | |
| 2 | |
| FUNDING_TX | |
| IDX_001 | |
| | |
| | |
| OP_0 <Sig G> <Placeholder for Sig H> <serialized script guest> | |
| <ScriptSignatureFlags> | |
| 0xFFFFFFFF | |
| FUNDING_TX | |
| IDX_002 | |
| | |
| | |
| OP_0 <Sig G> <Placeholder for Sig H> <serialized script hotel> | |
| <ScriptSignatureFlags> | |
| 0xFFFFFFFF | |
| 3 | |
| 1,000 | |
| | |
| | |
| OP_HASH160 <script_hash_token3> OP_EQUAL | |
| 3,025,000 | |
| | |
| | |
| OP_DUP OP_HASH160 <Address H> OP_EQUALVERIFY | |
| OP_CHECKSIG | |
| 2,975,000 | |
| | |
| | |
| OP_DUP OP_HASH160 <Address C> OP_EQUALVERIFY | |
| OP_CHECKSIG | |
| 0 | |

Fig. 11A

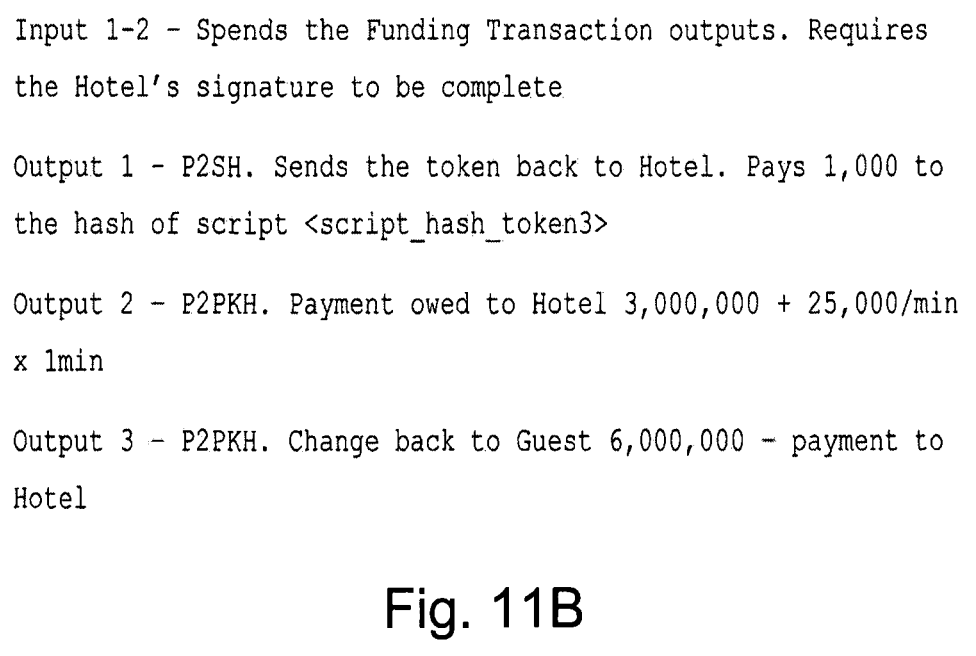

Input 1-2 – Spends the Funding Transaction outputs. Requires
the Hotel's signature to be complete Output 1 – P2SH. Sends the token back to Hotel. Pays 1,000 to
the hash of script <script_hash_token3>

Output 2 – P2PKH. Payment owed to Hotel 3,000,000 + 25,000/min
x 1min

Output 3 – P2PKH. Change back to Guest 6,000,000 – payment to
Hotel

Fig. 11B

BLOCKCHAIN IMPLEMENTED METHOD AND SYSTEM

The present invention relates to a computer implemented method for transferring an asset, such as a digital asset, between a first user and a second user. In particular, but not exclusively, it may relate to a computer implemented control mechanism for determining how an asset transfer process is to be executed via a plurality of transactions on a blockchain platform. The invention may comprise the use of a micro-payment channel.

In this document we use the term 'blockchain' for the sake of convenience and ease of reference because it is currently the most widely known term in this context. The term is used herein to include all forms of electronic, computer-based distributed ledgers, including consensus-based blockchains, alt-chains, sidechains and transaction-chain technologies, permissioned and un-permissioned ledgers, private and public ledgers, shared ledgers and variations thereof.

A blockchain is an electronic ledger which is implemented as a computer-based decentralised, distributed system made up of blocks which in turn are made up of transactions. Each transaction includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. For example, a script embedded into an output may specify which cryptographic signatures are required to access the output of the transaction. On the Bitcoin platform, these scripts are written using a stack-based scripting language.

In order for a transaction to be written to the blockchain, it must be i) validated by the first node that receives the transaction—if the transaction is validated, the node relays it to the other nodes in the network; and ii) added to a new block built by a miner; and iii) mined, i.e. added to the ledger of past transactions.

The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations fall within the scope of the invention.

Blockchain technology is most widely known for the use of cryptocurrency implementation. However, in more recent times, digital entrepreneurs have begun exploring both the use of the cryptographic security system Bitcoin is based on, and the data that can be stored on the Blockchain, to implement new systems.

One area of current interest and research is the use of the blockchain for the implementation of "smart contracts". These are computer programs designed to automate the execution of the terms of a contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token, which has no discernable meaning or value. The token thus serves as an identifier that allows the real-world item to be referenced.

Yet another use of blockchain-related technology relates to "micropayment channels". At the time of writing, a description of micropayment channels is available on the internet at: https://bitcoinj.github.io/working-with-micro-payments. These can be used to enable regular payments to be made from a customer to a merchant, for example to pay for time-related online services such as internet access. Such micropayment channels operate by generating a first, funding blockchain transaction having an output representing a deposit payable by a customer to a merchant, and refundable to the customer after a specified locktime, and which is submitted to the blockchain after it is generated. In the prior art, this funding transaction may also be known as a "refund transaction". A second, "replaceable" blockchain transaction is generated having an output representing a payment to a merchant. The replaceable transaction is a copy of the previous transaction but refunds less back to the customer. This process can be repeated, such that the replaceable transaction is periodically updated to increment the amount of the payment to the merchant. The merchant holds onto the replaceable transactions until only the final transaction is submitted to the blockchain to redeem the payment, thereby minimising unnecessary processing of data and unnecessary occupation of memory on the blockchain. The replaceable transaction is given this name because it replaces the previous transaction provided by the client. The funding and replaceable transactions are normal blockchain transactions as known in the prior art, enabling normal use to be made of the blockchain.

An example of a known such unidirectional micropayment channel is shown in FIG. 1.

Referring to FIG. 1, a micropayment channel for enabling a customer to pay a merchant for an online, time-dependent digital asset such as internet access, is initially created in step S1 by a customer and a merchant agreeing upon an implicit/explicit contract which defines details of how the contract is to be performed, for example deposit size, payment amount and payment frequency. The micropayment channel is unidirectional in the sense that an asset (in the form of payment) is transferred from the customer to the merchant via the blockchain, but not from the merchant to the customer. A first, funding blockchain transaction is then generated in step S2, the transaction having a first input representing a deposit of funds by the customer, and a first output by means of which the entire deposit is paid to a script redeemable by either the customer's and merchant's signatures, or by the customer's signature alone after a locktime N. The funding transaction is signed by the customer and submitted to the blockchain in step S3.

A replaceable blockchain transaction is then generated in step S4, in order to make a payment by the customer to the merchant. The replaceable blockchain transaction has a single input, spending the deposit from the funding transaction, and a pair of outputs, one output paying an amount due to the merchant, and the other output paying the remainder back to the customer. The replaceable transaction can be unlocked by means of the customer's and merchant's signatures. The replaceable transaction is signed by the customer and then sent to the merchant in step S5.

As the amount of time-dependent online asset supplied by the merchant to the customer, for example internet access or content, increases with time, the replaceable transaction is updated in step S6 to increment the amount of the first output payable to the merchant and to decrement the second output payable back to the customer. In order to redeem the payment, the merchant signs the final replaceable transaction and submits the signed transaction to the blockchain in step S7. On the other hand, if no replaceable transaction has been received by time N, the customer can redeem an output of a refunding transaction in step S8, having a single input spending the deposit from the funding transaction, and a single output paying the entire deposit to an address specified by the customer, by supplying the customer signature. The customer signs the refund transaction and submits it to the blockchain in step S9.

This arrangement suffers from the drawback that although the funding transaction representing payment of the deposit ensures security of payment to the merchant, the asset transferred via the blockchain from the customer to the merchant is decoupled from the agreement between the customer and the merchant. As a result, in the event of a disagreement between the merchant and the customer, it may be difficult for the merchant to demonstrate the necessary correlation between the agreement and the related blockchain transactions, or impose conditions on the supply of the online service or take action in the event of unauthorised activity by the customer, other than by redeeming the latest replaceable transaction to terminate the micropayment channel.

Preferred embodiments of the present invention seek to overcome one or more of the above disadvantages of the prior art.

The invention may provide a computer implemented method and corresponding system as defined in the appended claims.

The invention may be described as a tokenisation method/system. It may comprise the use of a token or coloured coin for representing, via a blockchain, an asset which is to be transferred from one party to another and/or a contract which defines the transfer of the asset. This asset may be referred to as a "transfer asset". Transfer of the asset may be defined or detailed in a machine-executable smart contract.

Additionally or alternatively, the invention may be described as a method/system for implementing and/or executing a micropayment channel via a blockchain.

Additionally or alternatively, the invention may be described as a control method/system. It may control the provision of a transferred asset from one party (user) to another. Additionally or alternatively, it may control the transfer and/or exchange of a transfer asset between users of the invention. The users may be referred to as "parties" or "participants". They may be referred to as "an asset receiver or recipient" and corresponding "asset provider".

The transfer asset may be any type of digital, physical, electronic or abstract asset. It may be a service or goods.

The method of the invention may comprise steps for transferring a (transfer) asset between a first user and a second user.

The method may enable or facilitate transfer of the asset by means of a blockchain. This may or may not be the Bitcoin blockchain.

In accordance with one form of wording, the invention may provide a computer-implemented method. The method may be a method of implementing and/or executing a micropayment channel on a blockchain. Additionally or alternatively, the method may be a method of performing an exchange or transaction via a blockchain. It may be a method of controlling submission of a transaction to a blockchain.

The method may comprise the steps:

submitting a funding transaction to the blockchain network, wherein the funding transaction:

i) comprises a tokenised contract relating to an asset to be transferred from a second user to a first user; and ii) is signed by the first user;

sending, from the first user to the second user, one or more subsequent transactions wherein each said subsequent transaction spends an output of the funding transaction and is signed by the first user;

submitting one of the subsequent transactions to the blockchain network, the submitted transaction having been signed by the second user.

There may be a plurality of subsequent transactions which are generated. These may be generated in series, on after the other. The funding transaction and/or subsequent transaction(s) may comprise an output (TxO) which transfers some value/asset/funds (eg BTC) to the first user. Each subsequent transaction may pay less value/funds/asset back to the first user.

The "tokenised contract" may be a token (which may be referred to as a coloured coin) which represents the contract or its location. The contract may be a machine-executable smart contract. The smart contract may be generated by the asset provider. The token may be provided within a script. It may be provided within the metadata of the script. The script may be provided in a locking script of a blockchain transaction.

The contract may be generated by the second user (asset provider). Thus, in one or more embodiments the invention may provide a novel combination of several techniques including smart contracts, tokens and micropayment channels.

In accordance with an alternative wording, the method may comprise the steps:— generating a first blockchain transaction comprising at least one first input representing a respective first asset transferrable from the second user to the first user, and at least one first output representing a respective second asset, the second asset redeemable by providing a cryptographic signature of the first user and a cryptographic signature of the second user;

generating a second blockchain transaction having at least one second input representing a respective said second asset, and at least one second output representing a respective third asset transferrable from the first user to the second user, wherein said third asset is exchanged for a respective said first asset, and wherein said second output is redeemable by providing a cryptographic signature of the first user and a cryptographic signature of the second user; and repeating generation of said second blockchain transaction to update the value of said third asset.

By generating a first blockchain transaction comprising at least one first input representing a respective first asset, this provides the advantage of enabling data relating to the first asset to be included in the first transaction. For example, the first blockchain transaction may provide an unalterable record of an agreement between the first and second users, and may include date which can cause action to be taken in the event of certain circumstances, for example a smart contract or control data causing certain actions in the event of unauthorised activities by the first user, such as a payment to a specified party.

The second blockchain transaction may have at least one third output representing a respective said first asset.

This provides the advantage of enabling the first asset to be transferred to another party after use, for example to be returned to the second user for reuse, thereby preventing the first asset from unnecessarily occupying memory or taking up processing power in the blockchain.

At least one said first input may contain control data for generating a third blockchain transaction.

This provides the advantage of enabling automatic action to be taken, for example in the case of unauthorised activity by the first user.

At least one said second asset may be redeemable as a result of non-redemption of a said third asset, by providing the cryptographic signature of the first user.

At least one said second asset may be redeemable, after expiry of a first locktime, by providing the cryptographic signature of the first user.

According to another aspect of the present invention, there may be provided a computer implemented method for transferring at least one asset between a first user and a second user by means of a blockchain, the method comprising:— generating a fourth blockchain transaction having at least one fourth output representing a respective first asset transferrable from the second user to the first user and corresponding to a respective first input of a first blockchain transaction;

receiving a first blockchain transaction comprising at least one first input representing a respective said first asset, and at least one first output representing a respective second asset, the second asset being redeemable by providing a cryptographic signature of the first user and a cryptographic signature of the second user;

submitting said first blockchain transaction to the blockchain;

receiving a plurality of second blockchain transactions, each said second blockchain transaction comprising at least one respective second input representing a respective said second asset, and at least one respective second output representing a respective third asset transferrable from the first user to the second user, wherein said third asset is exchanged for a respective said first asset, wherein said third asset is redeemable by providing a cryptographic signature of the first user and a cryptographic signature of the second user; and submitting a said second blockchain transaction to the blockchain.

The first blockchain transaction may comprise at least one fifth output representing a respective fourth asset redeemable by providing the cryptographic signature of the second user.

The fourth asset may be redeemable as a result of non-redemption of the third asset, by providing the cryptographic signature of the second user.

The fourth asset may be redeemable after expiry of a second lock time, by providing the cryptographic signature of the second user.

At least one said first and/or second asset may comprise machine-executable code.

The various "aspects" set out above are not intended to be limiting of the invention. Any feature mentioned in relation to one aspect or wording of the invention may also be applicable to one or more aspects or wordings provided above.

The invention may provide a method/system substantially as described in the following illustrative embodiment or use case provided below.

A preferred embodiment of the invention will now be described, by way of example only and not in any limitative sense, with reference to the accompanying drawings in which:

FIG. 1 is a schematic diagram showing operation of a known unidirectional micro payment channel;

FIG. 2 is a schematic diagram showing operation of a unidirectional micropayment channel embodying the present invention;

FIG. 3 shows a blockchain tokenisation process used in the method of FIG. 2;

FIGS. 4A to 8B show blockchain transactions used in the micropayment channel of FIG. 2; and FIGS. 9A to 11B show blockchain transactions used in Example 1.

With reference to the Figures, we show an illustrative use case which relates to the purchase of a service. However, it is important to note that the invention is not limited in this regard. Embodiments of the invention may be arranged to facilitate the exchange of any asset. This asset may be referred to as a "transfer asset". The transfer asset may be a digital asset, and may represent an entity of any type e.g. physical, electronic, digital or abstract. In the following description, references to the first, second, third and fourth blockchain transactions, and to the first, second, third and fourth assets, have the same meaning as in the claims.

It is also important to note that the example provided herein relates to a scenario in which a purchase is made. Therefore, the terms "customer" and "merchant" may be used to refer to participants in the exchange. However, the invention is not intended to be limited to retail-oriented applications. Instead, the invention is equally applicable to applications where no goods or services are purchased. Transfer of digital assets (funds) made by blockchain transactions may serve purely to facilitate the blockchain-related implementation, as all blockchain transactions (Txs) must have an input and an output.

Referring to FIG. 2, a micropayment channel embodying the present invention is shown. The micropayment channel may be referred to as a "unidirectional micropayment channel". The micropayment channel is arranged to enable a participating party (hereafter a "customer") to pay another participating party (hereafter "a merchant") for an online, time-dependent digital asset such as internet access by means of a payment transaction which can be updated one or more times. This enables an output of the micropayment channel which represents payment for a time-dependent asset to be updated as more of the asset it transferred over time. This may be referred to as the "transfer asset" because it is the asset which is being provided from one user to another. The invention therefore provides a technical mechanism for controlling the way in which the transfer asset is transferred. The blockchain transactions provide the technical vehicle for determining whether or not the asset can be transferred between the parties, and how and when this transfer is to be performed.

An important advantage of the invention is that the exchange process can be fully automated, thus removing the need for manual participation once the process has been initiated. The system can be arranged such that computing agents can determine how and when transactions are to be generated and/or submitted to the blockchain.

Initially, a merchant creates a number C of contracts for services or assets in step S101. Preferably, the contracts are machine executable smart contracts which define certain details, such as the deposit size, payment amount and payment frequency. Thus, by utilising smart contracts the invention enables the asset provider (e.g. merchant) to have some input into the micropayment process. This is an advantage over the prior art arrangements, and the invention provides an alternative, technical mechanism for controlling how the micropayment channel is executed. A greater degree of granularity or conditionality is introduced into the execution via the smart contract. For example, the asset provider can also use smart contracts to physically control access to an asset such as internet access.

The merchant then generates a fourth blockchain transaction in the form of a minting blockchain transaction ("minting Tx") in step S102 having an input representing funds provided by the merchant, and a series of C outputs, each of which pays part of the funds to a script or token representing a respective first asset forming part of a contract between the merchant and a customer. It will be appreciated by persons skilled in the art that the party generating the minting transaction ("the minter") need not be the merchant. For example, a merchant may choose to contract generation of the minting transaction to a third party, or use software supplied for this purpose by a third party.

After the minting transaction has been submitted to the blockchain in Step S103, the merchant publishes the scripts of the tokens and details of the contracts on a platform accessible to the customer in step S104. Steps S101 to S104 can be carried out at any time, enabling the merchant to add new tokens to the list, and tokens can be melted (i.e. deleted or re-used) by the merchant at any time.

FIG. 3 shows an example of a token minting transaction, which can be the minting transaction of step S102 of FIG. 2, and a token transfer transaction, which can be the transfer transaction forming the output of the replaceable transaction of step S108 of FIG. 2. The minting transaction is generated by the token minter in step S201 and has an input representing funds provided by the minter and a single output paying funds to a script hash, being the hash of multi-signature script including metadata pointing to an electronic certificate. The script is of the following form:
Script
    <NumSigs Metadata1 Metadata2 . . . PubKey1 PubKey2 . . . NumKeys OP_CHECKMULTISIG>
Where Metadata1 . . . etc. are pretend compressed public keys (32 bytes). An example of metadata format can be seen below:

| Field | Sub-field | Bytes | Value | Comments |
|---|---|---|---|---|
| Metadata1 | ContractType | 4 | | Coded value indicates type of contract. |
| | ContractPointer | 16 | | IPv6 address of the actual contract file location |
| | ContractTypeData1 | 12 | | Format depends on value of ContractType. Padded with zeros |
| Metadata2 | ContractHash | 20 | | RIPEMD-160(SHA256(actual contract file addressed by ContractPointer)) |
| | ContractTypeData2 | 12 | | Format depends on value of ContractType. Padded with zeros |

The token may represent a smart contract, which can be stored on a computer-based resource e.g. a server. The smart contract is written in a machine executable form and thus can be read, executed and/or enforced by automated agents (which may be called "bots"). The contract may, for example, be stored in a Distributed Hash Table (DHT) which is provided off-block. Tokens may be minted or melted by the minter at any time.

The token (or "coloured coin") which represents the contract may be provided as metadata in the script. The token can enable the contract to be accessed. For example, the token may provide the location or URI of where the smart contract is stored, or a hash of the location.

The merchant then submits the minting transaction to the blockchain in Step S103. Details of the minting transaction are shown in FIG. 4A, and details of the input and output of the transaction and the script to which an output of the minting transaction pays its funds are shown in FIG. 4B.

Details of the input and output of the transaction and the script to which an output of the minting transaction pays its funds are as follows:
Input 1—funds by Merchant to mint the token
    Funds amount and unlocking script is arbitrary
Output 1—pays funds to <script_hash_token> which is Hash160 of the script:

Script OP_1 <Metadata1> <Metadata2> <PubKey_Merchant> OP_3
    OP_CHECKMULTISIG
    where metadata1 & metadata2 are pretend compressed public keys
    containing information about the contract PubK1 . . . are true public keys.

The token can be redeemed by the script containing the minter's public key as shown in FIG. 2.

A token transferring transaction is generated in step S202 and has an input spending the token and its associated funds, and an output paying the funds to a hash of a script representing the token being owned by party A.

Referring back to FIG. 2, the micropayment channel is then initially created when a customer then browses the contracts and creates a first blockchain transaction in the form of a funding transaction in step S105 for a contract he wishes to enter. The funding transaction has a first input representing a deposit of funds by the customer, and a second input representing a first asset represented by the second input containing the script comprising the token provided by the merchant. The funding transaction has an output representing a second asset by paying an amount X to the customer, which is redeemable by providing the customer's signature and the merchant's signature, or by providing the customer's signature only after expiry of a locktime N, and an output representing a third asset by paying an amount Y to the merchant, which is redeemable by providing the customer's signature and the merchant's signature, or by providing the merchant's signature only after expiry of the locktime N. The amount X could typically be the full amount of the deposit, representing a full refund of the deposit to the customer, and Y could represent a full refund of the token value to the merchant. However, it is also possible to set X to a smaller value, and Y to a larger value, representing payment of a non-refundable deposit to the merchant.

The customer then signs the funding transaction and sends it to the merchant at step S106. The merchant signs the funding transaction and submits it to the blockchain in step S107. Details of the funding transaction are shown in FIG. 5A, and details of the inputs and the outputs of the funding transaction and the scripts for unlocking the inputs and outputs of the funding transaction are shown in FIG. 5B.

Details of the inputs and the outputs of the funding transaction and the scripts for unlocking the inputs and outputs of the funding transaction are as follows:

Input 1—deposit by the Customer as required by contract
   The deposit amount and unlocking method is arbitrary Input 2—token by Merchant, Customer copies this from a platform where the Merchant publishes the contract and token script. <script_serialized_token> is serialized token script:

```
Script   OP_1 <Metadata1> <Metadata2> <PubKey_Merchant> OP_3
         OP_CHECKMULTISIG
         where metadata1 & metadata2 contain information about the
         contract
```

Output 1—pays X amount to <script_hash_customer> which is a Hash160 of:

```
Script   OP_IF <now + time N> OP_CHECKLOCKTIMEVERIFY
         OP_DROP
         <PubKey_Customer> OP_CHECKSIGVERIFY OP_ELSE
         <PubKey_Customer> <PubKey_Merchant> OP_2
         OP_CHECKMULTISIGVERIFY OP_ENDIF
```

<script_hash_customer> can be unlocked by:
   OP_1<Sig_Customer> <serialized script customer> with Locktime N; or
   OP_0<Sig_Customer> <Sig Merchant> <serialized script customer>
X amount paid (450,000 here) is adjustable depending on contract terms. i.e. how much is refunded to Customer if no Replaceable Transaction is submitted to the blockchain before time N Output 2—pays Y amount to <script_hash_merchant> which is a Hash160 of:

```
Script   OP_IF <now + time N> OP_CHECKLOCKTIMEVERIFY
         OP_DROP
         <PubKey_Merchant> OP_CHECKSIGVERIFY OP_ELSE
         <PubKey_Customer> <PubKey_Merchant> OP_2
         OP_CHECKMULTISIGVERIFY OP_ENDIF
```

<script_hash_merchant> can be unlocked by:
   OP_1<Sig Merchant> <serialized script merchant> with Locktime N; or
   OP_0<Sig_Customer> <Sig Merchant> <serialized script merchant>
Y amount paid (50,000 here) is adjustable depending on contract terms. i.e. how much is paid to Merchant if no Replaceable Transaction is submitted to the blockchain before time N Referring again to FIG. 2, when a payment is to be made, the customer generates a second blockchain transaction in the form of a replaceable blockchain transaction in step S108. The replaceable transaction has inputs spending amounts X and Y from the funding transaction respectively, and an output paying the token value to the script of the token, an output representing a third asset by paying an amount due to the merchant, and an output paying the remaining funds to the customer. The customer signs the replaceable transaction and sends it to the merchant in step S109. It should be noted that the replaceable transactions are not submitted to the blockchain. Instead, they are signed by the customer, sent to the merchant who can choose which replaceable transaction to sign and submit to the blockchain, and when.

In order to redeem each of the outputs of the replaceable transaction, the customer's signature and the merchant's signature are required. When a subsequent payment becomes due, steps S108 and S109 are repeated, incrementing the amount due to the merchant and decrementing the amount to be repaid to the customer.

Finally, the merchant signs both inputs of the latest replaceable transaction and submits the transaction to the blockchain in step S110 to redeem the amount due to the merchant. Details of the replaceable transaction are shown in FIG. 6A, and details of the inputs and outputs of the transaction and scripts for unlocking inputs and outputs of the replaceable transaction are shown in FIG. 6B.

Details of the inputs and outputs of the transaction and scripts for unlocking inputs and outputs of the replaceable transaction are as follows:

Input 1—spends Output 1 of Funding Tx using Customer & Merchant sig to unlock <serialized script customer>:

```
Script   OP_IF <now + time N> OP_CHECKLOCKTIMEVERIFY
         OP_DROP
         <PubKey_Customer> OP_CHECKSIGVERIFY OP_ELSE
         <PubKey_Customer> <PubKey_Merchant> OP_2
         OP_CHECKMULTISIGVERIFY OP_ENDIF
```

Input 2—spends Output 2 of Funding Tx using Customer & Merchant sig to unlock <serialized script merchant>:

```
Script   OP_IF <now + time N> OP_CHECKLOCKTIMEVERIFY
         OP_DROP
         <PubKey_Merchant> OP_CHECKSIGVERIFY OP_ELSE
         <PubKey_Customer> <PubKey_Merchant> OP_2
         OP_CHECKMULTISIGVERIFY OP_ENDIF
```

Output 1 pays funds to <script_hash_token> which is Hash160 of the script:

```
Script   OP_1 <Metadata1> <Metadata2> <PubKey_Merchant> OP_3
         OP_CHECKMULTISIG
         where metadata1 & metadata2 are pretend compressed public
         keys contain information about the contract
```

This sends the token back to the Merchant
Output 2—pays amount owed to Merchant
   This amount should be monotonically increasing with each new Replaceable Tx
Output 3—pays remainder of deposit to Customer
   If no replaceable transaction has been received by expiry of locktime N, customer and merchant refund blockchain transactions are executed. In particular, the customer refund transaction generated at step S111 has a single input spending funds X from the funding transaction of step S105 and pays the amount X to an address specified by the customer.

The output of the customer refund transaction only requires the customer's signature. The customer signs the transaction and submits it to the blockchain in Step S112.

Details of the customer refund transaction are shown in FIG. 7A, and details of the input and output of the customer refund transaction and scripts for unlocking inputs and outputs of the customer refund transaction are shown in FIG. 7B.

Similarly, the merchant refund transaction generated at step S113 has a single input spending funds Y from the funding transaction of step S105 and pays the amount Y to an address specified by the customer. The output of the merchant refund transaction only requires the merchant's

EXAMPLE 1

In the following example, the Merchant is a Hotel which offers internet access, and the Customer is a guest of the Hotel wanting to purchase internet access.

The Hotel has a router management software which allows it to set a bandwidth, download, and time limit to different IP/MAC addresses. To monetize the internet access, the Hotel offers the following services to its guests:

| Service No. | Bandwidth Limit | Download Limit | Time Limit | Locked Deposit* | Minimum Payment* | Rate* |
|---|---|---|---|---|---|---|
| 1 | 30 Mbps | 2 GB | 24 hrs | 4,500,000 (~$18) | 2,250,000 (~$9) | 1,125/MB (~$0.0045) |
| 2 | 30 Mbps | 1 GB | 24 hrs | 2,500,000 (~$10) | 1,250,000 (~$5) | 1,250/MB (~$0.005) |
| 3 | 10 Mbps | Unlimited | 2 hr | 6,000,000 (~$24) | 3,000,000 (~$12) | 25,000/min (~$0.1) |
| 4 | 10 Mbps | Unlimited | 1 hr | 3,750,000 (~$15) | 1,875,000 (~$7.5) | 31,250/min (~$0.125) |

*The unit is Satoshi. $ value is estimated with $400/BTC signature. The merchant signs the transaction and submits it to the blockchain in Step S114. Details of the merchant refund transaction are shown in FIG. 8A, and details of the input and output of the merchant refund transaction and scripts for unlocking inputs and outputs of the merchant refund transaction are shown in FIG. 8B.

Details of the input and output of the customer refund transaction and scripts for unlocking inputs and outputs of the customer refund transaction are as follows:

Input 1—spends Output 1 of Funding Tx using Customer sig to unlock <serialized script customer>:

| | |
|---|---|
| Script | OP_IF <now + time N> OP_CHECKLOCKTIMEVERIFY |
| | OP_DROP |
| | <PubKey_Customer> OP_CHECKSIGVERIFY OP_ELSE |
| | <PubKey_Customer> <PubKey_Merchant> OP_2 |
| | OP_CHECKMULTISIGVERIFY OP_ENDIF |

Note that the Sequence Number is not 0xFFFFFFFF which signals for Locktime N to be checked Output 1—pays the amount in Funding Tx Output 1 to whatever addresses Customer chooses to nominate Details of the input and output of the merchant refund transaction and scripts for unlocking inputs and outputs of the merchant refund transaction are as follows:

Input 1—spends Output 1 of Funding Tx using Merchant sig to unlock <serialized script merchant>:

| | |
|---|---|
| Script | OP_IF <now + time N> OP_CHECKLOCKTIMEVERIFY |
| | OP_DROP |
| | <PubKey_Merchant> OP_CHECKSIGVERIFY OP_ELSE |
| | <PubKey_Customer> <PubKey_Merchant> OP_2 |
| | OP_CHECKMULTISIGVERIFY OP_ENDIF |

Note that the Sequence Number is not 0xFFFFFFFF which signals for Locktime N to be checked Output 1—pays the amount in Funding Tx Output 2 to whatever addresses Merchant chooses to nominate Merchant can choose to use one of the outputs to remint the token Other Setup Details Hotel owns private/public key H which has 1 BTC (100,000,000 Satoshi)

Guest owns private/public key G which has 0.06 BTC (6,000,000 Satoshi)

Hotel has a server where it stores the tokens/contracts. It also has an intranet site which it uses to display the available tokens/contracts Steps 1. Hotel creates a Contract for each of its 4 services. It saves them as pdfs and stores them on its server 2. Hotel creates metadata1 and metadata2 for each of its 4 Contracts. The format is as follows:

| | Field Name | No. of bytes | Description |
|---|---|---|---|
| metadata1 | Contract Link | 32 | 32 character link to the contract |
| metadata2* | Contract Hash | 20 | RIPEMD(SHA256(contract file)) |

*the remaining 12 bytes of metadata2 are just zeros

3. Hotel creates a Minting Transaction which tokenizes the 5 Contracts.

a. Note that only 4 tokens are created here for simplicity. In practice multiples of each service/token can be created Details of the minting transaction are shown in FIG. 9A, and details of the input and output of the transaction and the script to which an output of the minting transaction pays its funds are shown in FIG. 9B.

Details of the input and output of the transaction and the script to which an output of the minting transaction pays its funds are as follows:

Output 1—P2PKH. Pays the remaining funds back to Hotel's address H

Output 2—P2SH (Token 1). Pays 1,000 Satoshi to the hash of the script <script_hash_token3>:

| | |
|---|---|
| Script | OP_1 <Metadata1> <Metadata2> <PubKey H> OP_3 |
| | OP_CHECKMULTISIG |
| | where metadata1 & metadata2 are pretend compressed public |
| | keys contain information about contract 1 |

Output 3-5 P2SH. Same as Output 2, except the metadata points to different contracts 4. Hotel submits the Minting Transaction to the blockchain 5. Hotel displays the tokens and contracts on its intranet site for guests to browse 6. Guest of the Hotel browses the intranet for internet access options and decides to go with service 3. It takes Token 3 and creates a Funding Transaction as per the associated Contract 3.

Details of the funding transaction are shown in FIG. 10A, and details of the inputs and the outputs of the funding transaction and the scripts for unlocking the inputs and outputs of the funding transaction are shown in FIG. 10B.

Details of the inputs and the outputs of the funding transaction and the scripts for unlocking the inputs and outputs of the funding transaction are as follows:

Input 2—Copy of the token details on Hotel's intranet site. Requires the Hotel's signature to be complete Output 1—P2SH. Pays 3,000,000 to the hash of the script <script_hash_guest>:

```
Script  OP_IF <now + 48hrs> OP_CHECKLOCKTIMEVERIFY
        OP_DROP
        <PubKey G> OP_CHECKSIGVERIFY OP_ELSE <PubKey G>
        <PubKey H> OP_2 OP_CHECKMULTISIGVERIFY
        OP_ENDIF
```

The locked funds can be claimed by the Guest in 48 hours time if not spent.

Output 2—P2SH. Pays 3,001,000 to the hash of the script <script_hash_hotel>:

```
Script  OP_IF <now + 48hrs> OP_CHECKLOCKTIMEVERIFY
        OP_DROP
        <PubKey H> OP_CHECKSIGVERIFY OP_ELSE <PubKey G>
        <PubKey H> OP_2 OP_CHECKMULTISIGVERIFY
        OP_ENDIF
```

The locked funds can be claimed by the Hotel in 48 hours time. This is the minimum payment due as per Contract 3 and the value of the token itself 7. Guest sends Funding Transaction to the Hotel through a form on the intranet site 8. Hotel checks the Funding Transaction, approves it by signing, and submits it to the blockchain 9. Hotel provides the Guest the details to access the internet. Alternatively, the token may contain machine executable instructions for automatically enabling and terminating access to the internet.

10. Guest starts to use the internet. The connection time and download amount is tracked by the router management software 11. The router management software detects that the connection has been used for 1 min. It sends the Guest a request for payment. Guest creates a Replaceable Transaction which it sends to the Hotel:

Details of the replaceable transaction are shown in FIG. 11A, and details of the inputs and outputs of the transaction and scripts for unlocking inputs and outputs of the replaceable transaction are shown in FIG. 11B.

Details of the inputs and outputs of the transaction and scripts for unlocking inputs and outputs of the replaceable transaction are as follows:

Input 1-2—Spends the Funding Transaction outputs. Requires the Hotel's signature to be complete Output 1—P2SH. Sends the token back to Hotel. Pays 1,000 to the hash of script <script_hash_token3>

Output 2—P2PKH. Payment owed to Hotel 3,000,000+ 25,000/min×1 min

Output 3—P2PKH. Change back to Guest 6,000,000− payment to Hotel

12. While the Guest is connected to the internet, the router management software continues to increment the connection timer and sends a payment request for every minute. Guest simply updates Output 2 & 3 of Replaceable Transaction to the latest amount and sends to the Hotel.

13. At the end of the 2 hours as per Contract 3, the Hotel signs the latest Replaceable Transaction and submits to the blockchain. In total the Guest has used 70 minutes, so Output 2 is 4,750,000 and Output 3 is 1,250,000.

It will be appreciated by persons skilled in the art that the above embodiment has been described by way of example only and not in any limitative sense, and that various alterations and modifications are possible without departure from the scope of the invention as defined by the appended claims.

The invention claimed is:

1. A computer implemented method comprising:

generating, by a processor, at least one smart contract;

generating, by the processor, for each of the at least one smart contract, a token;

generating, by the processor, a first transaction for the at least one smart contract;

transmitting, by the processor, the first transaction to a blockchain;

displaying, by the processor, the at least one smart contract with the corresponding token;

receiving, by the processor, a second transaction from a device of a customer wherein the second transaction comprises a cryptographic signature of the customer, an amount of digital currency and a script;

cryptographically signing, by the processor, the second transaction and transmitting, by the processor, the cryptographically signed second transaction to the blockchain;

receiving, by the processor, a third transaction from the device of the customer;

cryptographically signing, by the processor, the third transaction and transmitting, by the processor, the cryptographically signed third transaction to the script on the blockchain; and transmitting, by the script, the amount of digital currency to an address associated with the processor or the device of the customer.

2. The computer implemented method of claim 1, wherein the second transaction is a deposit of the customer redeemable as a result of non-redemption in the third transaction.

3. The computer implemented method of claim 1, the computer implemented method further comprising:

initializing a locktime, by the processor, in response to the transmitting of the cryptographically signed second transaction, wherein the transmitting of the cryptographically signed third transaction further comprises determining the locktime has expired.

4. The computer implemented method of claim 3, wherein the token represents a digital asset to be utilized by the customer, and wherein the locktime is a predetermined amount of time that the customer contracted for access to the digital asset.

5. The computer implemented method of claim 1, wherein the third transaction is a refund request from the customer.

6. A system, comprising a first computer and a second computer;

the first computer comprising:

a first processor;

a first non-transitory machine readable medium having first machine executable instructions that when executed by the first processor causes the first processor to execute first operations, the first operations comprising:

generating at least one smart contract;

generating for each of the at least one smart contract, a token;

generating a first transaction for the at least one smart contract;

transmitting the first transaction to the second computer;

displaying the at least one smart contract with the corresponding token;

receiving a second transaction from a device of a customer wherein the second transaction comprises a cryptographic signature of the customer, an amount of digital currency and a script;

cryptographically signing the second transaction and transmitting the cryptographically signed second transaction to the second computer;

receiving a third transaction from the device of the customer;

cryptographically signing the third transaction and transmitting the cryptographically signed third transaction to the script on the second computer; and, the second computer comprising:

a second processor;

a second non-transitory machine readable medium having second machine executable instructions that when executed by the second processor causes the second processor to execute second operations the second operations comprising:

transmitting the amount of digital currency to an address associated with the first processor or the device of the customer.

7. The system of claim 6, wherein the second transaction is a deposit of the customer redeemable as a result of non-redemption in the third transaction.

8. The system of claim 6, the first operations further comprising:

initializing a locktime in response to the transmitting of the cryptographically signed second transaction, wherein the transmitting of the cryptographically signed third transaction further comprises determining the locktime has expired.

9. The system of claim 8, wherein the token represents a digital asset to be utilized by the customer, and wherein the locktime is a predetermined amount of time that the customer contracted for access to the digital asset.

10. The system of claim 1, wherein the third transaction is a refund request from the customer.

* * * * *